United States Patent Office 3,444,909
Patented May 20, 1969

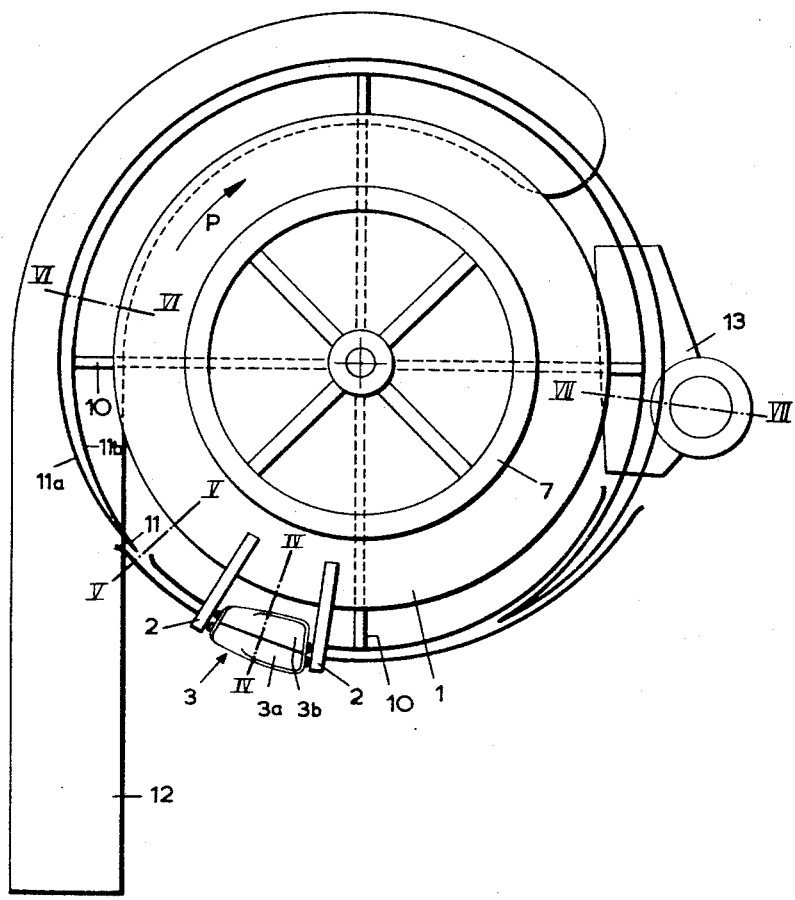

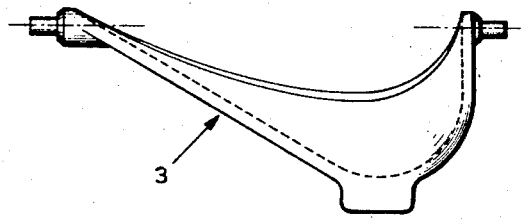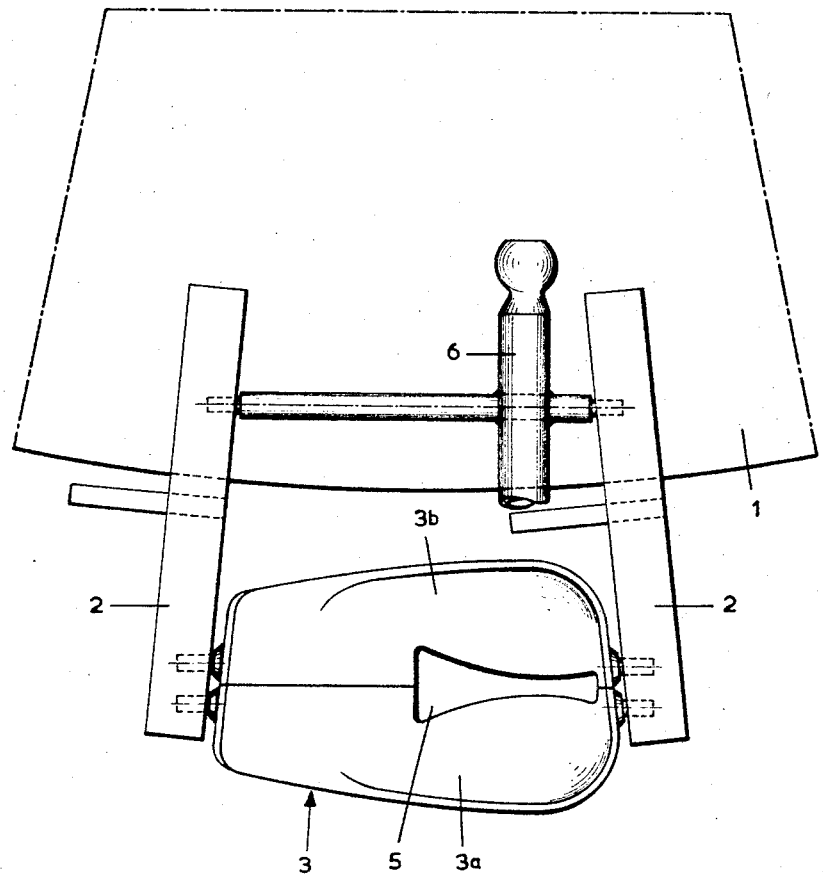

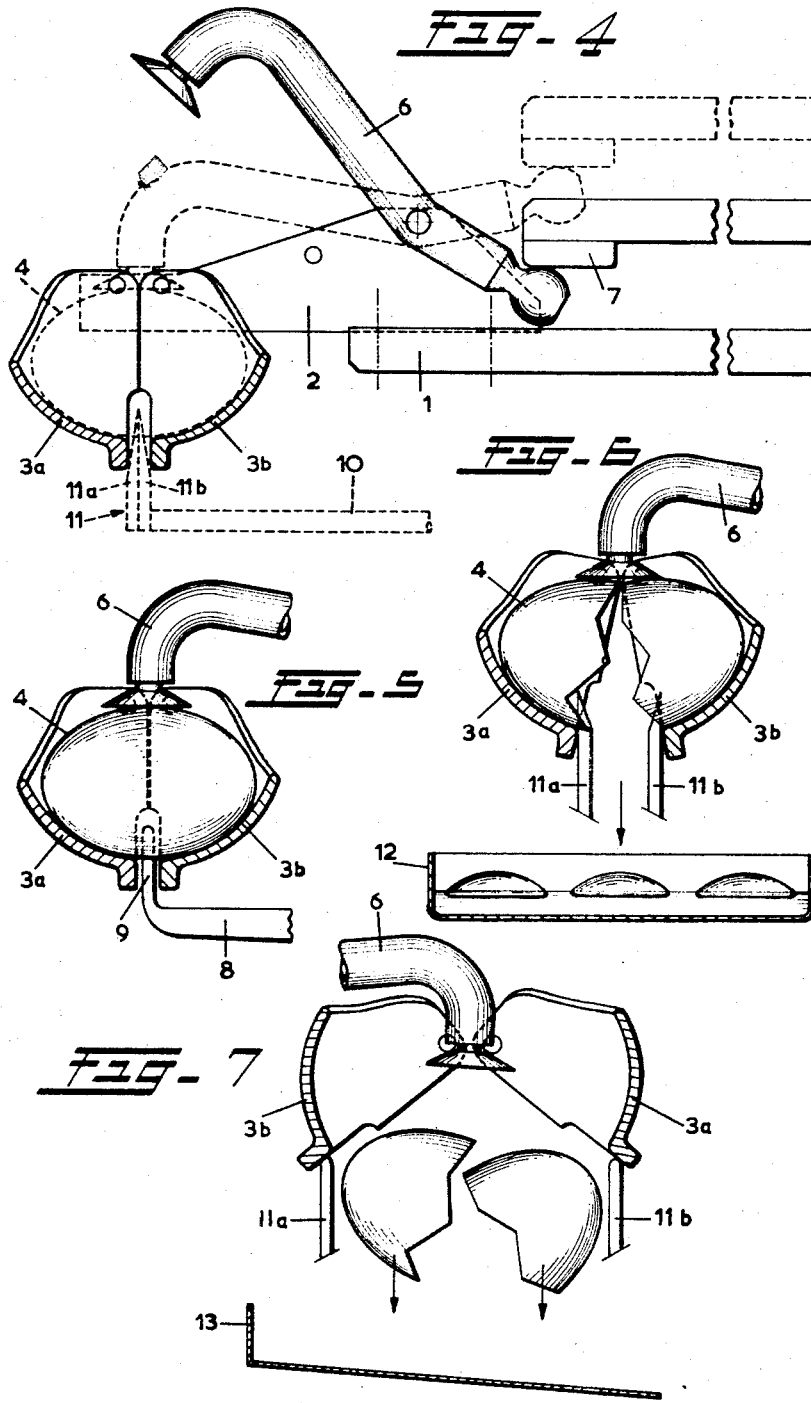

3,444,909
EGG BREAKING MACHINE
Cornelis Sol, Westzaan, Netherlands, assignor to Gerrit Timmerman, Landsmeer, Netherlands
Filed Oct. 10, 1966, Ser. No. 585,495
Int. Cl. A47j *43/14*
U.S. Cl. 146—2      1 Claim

ABSTRACT OF THE DISCLOSURE

An egg breaking machine is described with a series of egg carriers moving around a circular path and co-operating at portions of the path with a guide web. The shape of the egg carriers is such that an egg when inserted rolls down to a predetermined invariant position. As the carriers move around the path, egg hold-down means which are provided are raised, permitting introduction of an egg, and at the next station come down to hold the egg firmly in the carrier. At the next station an egg breaking hammer is introduced between the pivoted portions of the eggs and breaks the egg. In the next station the egg carriers encounter a guide web which moves them apart sufficiently to form a drainage channel for the egg yolk and egg white into suitable receptacles. This part of the guide web holds the eggs shells from falling out during drainage. At the next section the guide web moves the pivoted portions of the egg carriers still further apart, permitting an empty egg shell to drop in a suitable container. This portion of the guide web moves the pivoted sections apart but has no shell breaking knives.

Background of the invention

The egg breaking machines which have hitherto been proposed in various embodiments give little satisfaction, mainly as a result of their complicated construction, owing to which they are liable to frequent breakdowns, resulting in an unreliable operation.

Summary of the invention

It is an object of the present invention to obviate the drawbacks hitherto inherent to this kind of machine by an improved construction of the same.

To achieve this object, the present invention provides an egg breaking machine comprising a series of cup-shaped egg carriers movable along a dictated path, and in the direction of movement divided into two pivotally supported sections, the bottom of said egg carriers sloping down to a seat for receiving an egg with the longitudinal axis of the latter substantially horizontal and at right angles to the direction of movement, with a controlled egg hold-down associated with each egg carrier, there being provided along the path of movement of the egg carriers a breaking hammer arranged to penetrate from below between the egg carrier sections, and guide webs for temporarily swinging apart said egg carrier sections and retaining the egg shell parts present in said egg carrier sections.

Brief description of the drawings

FIG. 1 is a diagrammatic plan view of an egg breaking machine according to the invention with a circular path of movement for the egg carriers;
FIG. 2 is a side elevation and
FIG. 3 a plan view of an egg carrier;
FIG. 4 is a section on the line IV—IV in FIG. 1;
FIG. 5 is a section on the line V—V in FIG. 1;
FIG. 6 is a section on the line VI—VI in FIG. 1;
FIG. 7 is a section on the line VII—VII in FIG. 1.

Description of the preferred embodiment

Referring to the drawings, the egg breaking machine is equipped with a disk-shaped table 1 rotatable about a vertical axis in the direction P (FIG. 1) and provided with pairs of arms 2 projecting radially from the table. Each pair of arms 2 is arranged for pivotally supporting two halves 3a and 3b of an egg carrier 3, the plane of separation between the egg carrier halves 3a and 3b being tangential to the circle of revolution of the egg carriers. The bottom of each egg carrier 3 slopes downwardly to a seat for an egg 4 such that, irrespective of the position in which an egg is laid on the sloping bottom of the egg carrier, the egg will roll down to the seat and land there in a position in which the centre line of the egg is horizontal and at right angles to the path of movement of the egg carriers.

Adjacent the seat, the facing edges of the egg carrier halves 3a and 3b have a recess 5. Each pair of arms 2 also serves for pivotally supporting a hold-down 6, of which the end extended towards the turntable 1 is controlled by a stationary guideway 7 provided above the turntable. The configuration of the guideway 7 is such that as an egg carrier 3 moves along its circular path an egg seated in the egg carrier is held down so long as necessary by the outwardly extending end of the associated holddown 6 swung downwards by the guideway 7.

Starting from the position shown in FIG. 4, in which an egg is laid in an egg carrier, each egg carrier meets on its way, when reaching the position shown in FIG. 5, a breaking hammer 8 mounted under the turntable 1, which on that moment is swung upwardly by suitable means, during which movement the striker 9 of the breaking hammer 8 penetrates through the recess 5 in between the egg carrier halves 3a and 3b, and breaks the shell of the egg 4 seated in the egg carrier.

As it proceeds in the direction of the arrow P, the egg carrier 3 meets a stationary guide web 11 mounted under its trajectory, supported by radial arms 10, and consisting of two sections 11a and 11b, the bevelled upper edges of which penetrate through the recess 5 into the egg carrier 3 and into the then broken shell of the egg 4 held down by the hold-down 6. In the direction of advance of the egg carrier the distance between the guide web sections 11a and 11b is increased, and the bevels of their upper edges change into another direction. As a result, the egg carrier halves 3a and 3b, swinging about their pivots, are moved apart (FIG. 6), during which movement the egg shell halves are retained by the guide web sections 11a and 11b, but the contents of the egg are allowed to drop and are collected in a trough 12 arranged under the trajectory of the egg carriers.

Proceeding along the trajectory of the egg carrier 3, the halves 3a and 3b are kept in spread condition by the guide web sections 11a and 11b to allow the egg shell halves to drain. Finally the egg carrier sections 3a and 3b are spread so far by the guide web sections 11a and 11b, the upper edges of which have meanwhile merged into a rounded form, that the broken shell of the egg can also drop out of the egg carrier halves 3a and 3b to be collected in a discharge chute 13 (FIG. 7).

In the further part of the trajectory of the egg carriers, the configuration of the guideway 7 for the hold-down 6 and the guide web sections 11a and 11b is such that of each egg carrier the associated hold-down 6 is swung upwardly into an inoperative position, and the guide web sections 11a and 11b are disengaged from the egg carrier halves 3a and 3b, so that each egg carrier 3, which up to that moment was in the spread-open position, can close itself, for example under the action of a tension spring interconnecting the two sections of the egg carrier. As a result each egg carrier is again ready to receive an egg when returning in the position shown in FIG. 4.

The egg breaking machine according to the present invention, which is conspicuous for its simplicity of construction, ensures a reliable operation and takes up little space. While the construction of the machine with a circular trajectory is highly effective, it will be understood that trajectories of other configurations can also be used.

I claim:
1. An egg breaking machine comprising in combination,
   (a) a series of cup-shaped egg carriers formed of two pivoted sections, the sections being pivoted in radial arms,
   (b) means for moving the egg carriers in a predetermined circular path through a series of positions or stations, said cup-shaped carrier being shaped to permit eggs inserted therein to roll to a predetermined and invariant position with the long axis of the egg at right angles to the travel of the egg carrier regardless of how eggs are placed in the carrier,
   (c) hold down means for holding eggs in each carrier in said predetermined position,
   (d) a stationary machine framework and cam means at a first station to hold the egg carrier portions together and to retract the hold down means sufficiently to permit insertion of an egg in the carrier,
   (e) the cam means at a second station in the circular path to bring the hold down means into contact with the egg and to hold it against the bottom of the egg carrier,
   (f) means at the next station to raise egg breaking means from the bottom upwardly between the carrier sections to a sufficient height to break the egg shell, the egg carriers in their closed position leaving a bottom opening of dimension sufficient to permit introduction of the egg breaking means but insufficient to permit an egg to fall therethrough,
   (g) the stationary machine framework at the next station being in the form of a stationary guide web with blade-like upward projections which project through the bottom of the egg carrier to swing the pivoted sections of the egg carrier apart to form a direct drainage channel of dimensions sufficient to permit egg whites and yolks to pass through the drainage channel, said blade-like projections at this station projecting sufficiently into the egg carrier to engage the two halves of the broken egg shell and prevent downward movement thereof through the drainage channel,
   (h) yolk and white collecting means positioned below the egg carrier at the station of section (g), said station and said receiving means extending for a sufficient portion of the circular path to permit complete drainage of egg white and yolk,
   (i) means at the next station for receiving egg shell, the guide web being devoid of blade-like projections and of dimensions to swing the pivoted sections of the egg carrier sufficiently apart to permit egg shells to drop into the egg shell receiver, and
   (j) means at the final section to close the pivoted sections of the egg carrier and to retract the hold down means.

References Cited
UNITED STATES PATENTS

| | | |
|---|---|---|
| 2,031,294 | 2/1936 | Young et al. |
| 2,229,349 | 1/1941 | Sigler. |
| 3,190,328 | 6/1965 | Twedt et al. |
| 3,203,458 | 8/1965 | Shelton et al. |

W. GRAYDON ABERCROMBIE, *Primary Examiner.*